Oct. 8, 1968     R. J. HOFFMAN, JR     3,404,476
SIGN MOUNTING DEVICE AND METHOD
Filed Jan. 5, 1966
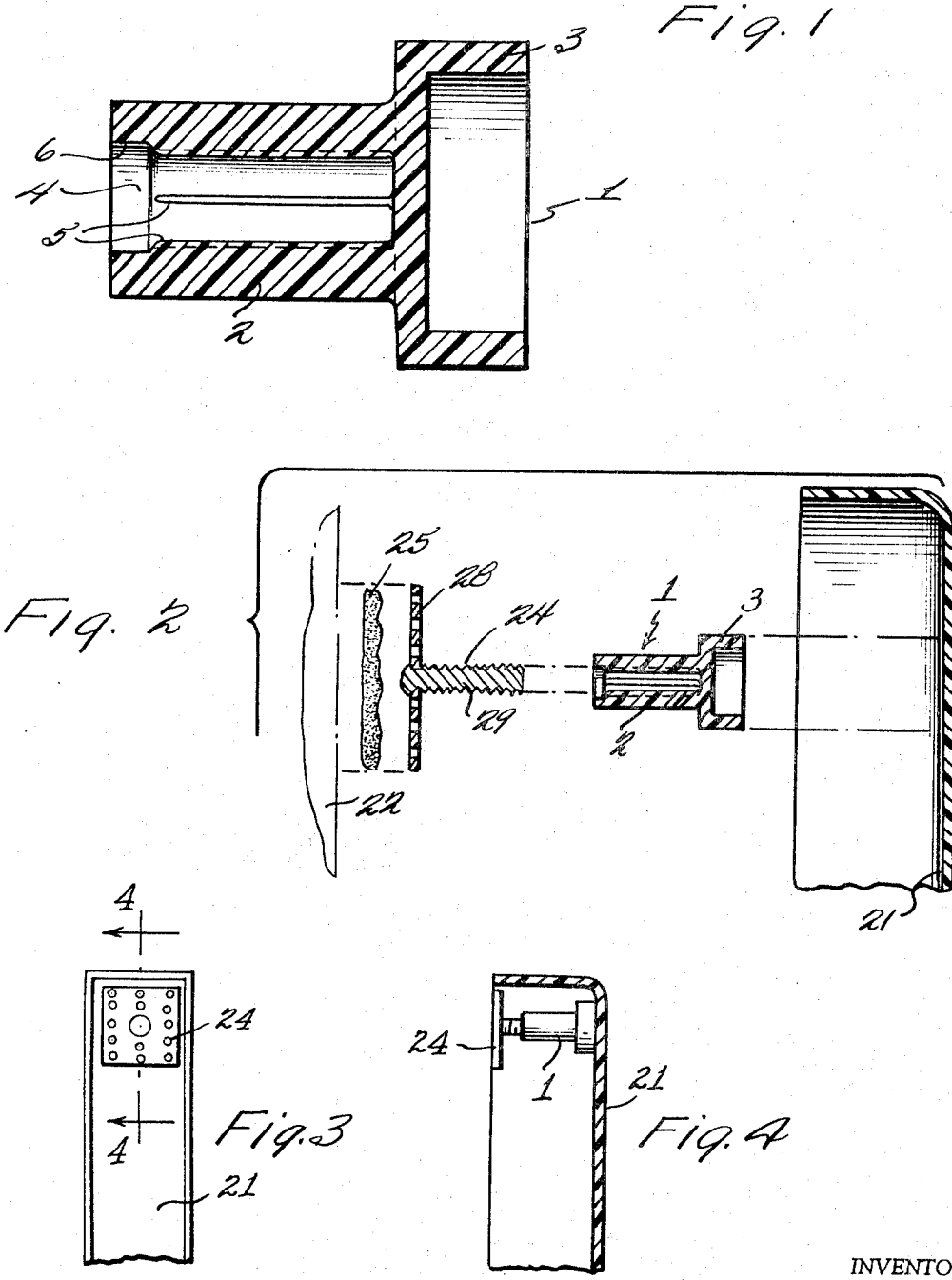
INVENTOR
ROBERT J. HOFFMAN, JR.
BY
ATTORNEYS

United States Patent Office 3,404,476
Patented Oct. 8, 1968

3,404,476
SIGN MOUNTING DEVICE AND METHOD
Robert J. Hoffman, Jr., Bellmawr, N.J., assignor to Delta Plastics Company, Bellmawr, N.J., a corporation of New Jersey
Filed Jan. 5, 1966, Ser. No. 518,948
7 Claims. (Cl. 40—142)

ABSTRACT OF THE DISCLOSURE

A combination for mounting a sign on a wall is disclosed. The sign has a self-tapping plastic mounting block attached to it. The block has a bore with at least one fillet in the bore, thereby making the block self-tapping. A grip pad with a machine threaded metal member is engaged in the bore, by tapping the fillet, and attached to the wall.

---

This invention relates to a plastic sign mounting device. In particular, this invention relates to a self-tapping plastic block which may be used in combination with a threaded metal rod or screw to mount a sign on a vertical surface, and the method of so mounting a sign.

Considerable difficulty has existed in the sign installation field in obtaining a device at low cost and consistent quality which will permit the installation of a sign (and by sign there is meant letters, symbols and the like) which will allow the installer easy adjustment of variables such as the distance of the sign from a vertical surface, such as a wall, with a minimum of installation time. Devices known and used by the prior art had a large number of rejects due to poor quality control, and were quite expensive in both material and labor costs. Typical of the devices known to the prior art, for example, is the display letter mount described in U.S. Patent No. 2,835,060, issued to W. I. Staaf, on May 20, 1958. As an examination of the Staaf patent will readily disclose, such a device would not gain acceptance by those who use plastic signs. Obviously, bonding the metal studs of Staaf to a plastic sign would be an expensive operation and the resultant bond might be questionable. In addition, the sign mounting assembly itself would be relatively expensive.

Accordingly, it is an object of this invention to provide a plastic sign mounting device. It is another object of this invention to provide a sign mounting device comprising a self-tapping plastic block adapted to receive a metal thread or screw. It is a further object of this invention to provide a plastic sign mounting device to be used in combination with a metal thread or screw wherein the only variable which must be considered regarding said metal thread or screw is the maximum diameter of the same—that is, thread pitch and angle may be ignored. It is a further object of this invention to provide a plastic sign mounting device with an instant, strong weld to the sign body. It is an additional object of this invention to provide a method for mounting plastic signs on vertical surfaces, by means of a self-tapping plastic block.

Briefly, the present invention consists of a novel device adapted to facilitate the mounting of plastic signs on vertical surfaces, such as walls, and the method of so using the device to mount signs. The device consists of a self-tapping plastic block which is used in combination with a metal mounting screw or thread. The self-tapping plastic block is produced by extrusion or injection molding techniques, of a plastic which may be solvent welded to the plastic sign. The self-tapping plastic block contains an axial bore with one or more fillets, preferably 3 or more fillets, inside of and parallel to the running diameter of the bore. While the self-tapping block may be of any desired configuration, a generally cylindrical shape is preferred.

The self-tapping plastic block may be welded to a plastic sign by means of a solvent which will soften the plastic of which both the sign and the block are made. The mounting screw or thread is turned into the self-tapping block a desired distance—that is, corresponding to the desired offset of the sign from the vertical surface. The mounting screw or thread may be installed in the wall at the time it is turned into the self-tapping block or it may be adapted to be fastened to the wall during a subsequent operation, for example, the mounting screw or thread may be conventionally fastened, such as welded or riveted, to a grip pad which may be spread with adhesive and pressed against the wall to produce a firm bond thereto.

The invention will be more fully understood by reference to the accompanying drawings in which:

FIGURE 1 is a sectional view of the self-tapping plastic block device of this invention.

FIGURE 2 is a schematic view showing the relationship of a plastic sign, the self-tapping plastic block, a combination grip pad and mounting screw, and the wall to which it is desired to install the sign.

FIGURE 3 is the back view of the sign of FIGURE 2 when ready for installation to the wall.

FIGURE 4 is a cross-section of the sign of FIGURE 3, made along line 4—4.

More particularly, FIGURE 1 shows a self-tapping plastic block 1 which comprises a cylindrical member 2 molded with a cylindrical mounting ring member 3, with a larger diameter, at one end. Running through member 2 is an axial bore 4, preferably centered in member 2. Molded in the walls of bore 4 and running parallel to the running diameter thereof are fillets 5. The member 2 and bore 4 may be of any desired configuration, with cylindrical construction preferred. The fillets 5 preferably run substantially the length of bore 4, however, an area 6 may be left in the bore 4 which is free of fillets 5.

The width and height of fillets 5 will naturally vary with the physical properties of the plastic of which the self-tapping block is constructed, as well as the diameter, pitch and type of screw or thread with which a connection is desired. In general, the fillets may be 0.005–0.090 inch in width, preferably 0.015–0.060 inch, and 0.005–0.1 inch in height, preferably 0.010–0.060 inch. The unfilleted area 6 of the bore performs the function of guiding the screw or thread member into the bore. Preferably, this unfilleted portion, which may be any length, is less than one major thread convolution long.

FIGURE 2 illustrates a self-tapping plastic block 1 which comprises a mounting ring 3 which is an integral part of rigid tube 2. This mounting ring is a recommended although not a necessary characteristic of the sign mounting device, as its purpose is primarily to provide added structural balance similar to the purpose of a building foundation, for example. The bonding surface of mounting ring 3 may be of any desired size, shape or contour, as long as it achieves the desired purpose of providing the surface contact for practical, efficient solvent welding. The mounting ring 3 can be welded to the sign 21 by the use of a suitable solvent, for example, methyl ethyl ketone when using acrylic signs and mounting blocks.

A combination adhesive grip pad and mounting screw 24, preferably made of stainless steel, comprises a flat perforated grip plate 28, of any desired configuration, which has centrally attached by any suitable means a mounting screw 29. As shown, the mounting screw 29 is perpendicular to the plane of the grip pad 28 and has upon its surface a thread.

An adhesive 25 is used to bond grip pad 28 to a vertical surface 22. The adhesive may be applied to either the surface or the grip pad but is preferably spread upon the grip pad.

FIGURE 3 is a back view of a sign 21 which is ready to be adhered to a vertical surface. The self-tapping plastic block has been solvent-welded to the back of the sign and the combination grip pad and mounting screw 24 has been screwed into the plastic block.

FIGURE 4 is a sectional view of the sign of FIGURE 3, taken along line 4—4. The sign 21 has a self-tapping plastic block 1 welded to it and the combination grip pad and mounting screw 24 has been turned into the block 1. The assembly is ready for an adhesive to be spread upon the grip pad and then be placed into position on a vertical surface.

When the sign is ready for mounting on the vertical surface, the self-tapping plastic block is welded to the back of the sign. This may be easily done by moistening the contacting surfaces of the block and the sign with a suitable solvent, for example, methyl ethyl ketone in the case of a "Plexiglas" acrylic sign while using a rubber-modified acrylic (Implex R) block. The combination grip pad and mounting screw is turned into the self-tapping block to produce a firmly attached, rigid assembly. The distance the combination grip pad is turned into the self-tapping block may be varied as desired to enable the sign to conform to the wall or other vertical surface.

The adhesive is then spread upon the back of the adhesive grip pad and the entire sign assembly is pressed against the vertical surface. The adhesive, which preferably has a putty-like consistency, should have sufficient strength to support the sign during the drying period. If desired, auxiliary temporary holding means may be used to attach the sign to the vertical surface until the adhesive has fully cured or dried.

As mentioned, the self-tapping plastic block and the sign may be constructed of a number of various plastic materials. At this time, signs are generally made from acrylic plastics, although other plastics, such as butyrates and glass reinforced polyesters and epoxies, are in use. The block may be made from a wide variety of various plastics which have the ability to be tapped by and hold a screw.

The choice of a suitable solvent naturally depends upon the type of plastic which is used in both the sign and the self-tapping plastic block. In the case of solvent resistant plastics, such as certain polyesters and epoxies, an adhesive may be used to adhere the self-tapping block to the plastic sign. While methyl ethyl ketone is the preferred solvent for welding rubber-modified acrylic blocks to acrylic signs, a number of other solvents, for example, methyl isobutyl ketone, acetone, etc., may be used.

The threaded metal member which engages the self-tapping plastic block is generally not self-tapping in itself. In fact, an ordinary machine screw thread is preferred to the so-called self-tapping screw threads, as a stronger connection is formed with the former. However, any conventional type of thread may be used and the only variable regarding the threaded metal rod or screw which must be considered is the maximum diameter and depth of thread of the same.

The mounting ring 3 of FIGURE 1 may be an annular ring, as shown, or may be of solid cross-section and of any desired configuration, or the bore 4 may extend completely through the entire block. The function of this mounting ring is to provide a sign assembly unit of higher shear strength and of greater bonding area. If desired, the mounting ring may be an extension of the cylindrical member 2.

The device of this invention is preferably used to mount a sign on a vertical surface; however, the sign may be mounted on any other surface, such as a horizontal overhead surface.

While the self-tapping plastic block of this invention is particularly adapted to be used in installing signs on vertical walls, a number of other utilities will be readily apparent to one of ordinary skill in the art. Such other uses might include, for example, self-tapping plain or chrome or copper plated knobs, athletic trophy mounting bases, desk pen holders and a wide variety of other applications where a metal screw or thread is to be joined to a plastic block.

I claim:

1. A combination for mounting a sign on a wall comprising a sign, a self-tapping plastic mounting block attached to said sign, said block defining a bore opening to the surface of said block opposite said sign, said block having at least one fillet in said bore running substantially the length of said bore, machine threaded means for engaging in locking relationship with said block by tapping said fillet, a grip pad mounted on said means, said grip pad attached to said wall.

2. The combination of claim 1 wherein said self-tapping plastic mounting block is produced by extrusion or injection molding techniques.

3. The combination of claim 1 wherein said sign is a plastic sign and said block is solvent-welded to said sign.

4. The combination as claimed in claim 1 wherein said block has at least three fillets in said bore.

5. The combination as claimed in claim 1 wherein a portion of said bore adjacent to said surface and less than 1 major thread convolution of said machine threaded means in length is free of fillets.

6. The combination as claimed in claim 1 wherein the fillet is about 0.005 to 0.09″ in width and about 0.005 to 0.1″ in height.

7. A combination as claimed in claim 1 wherein said self-tapping plastic mounting block is a rubber-modified acrylic plastic block.

References Cited

UNITED STATES PATENTS

| | | | |
|---|---|---|---|
| 434,650 | 8/1890 | Adams | 16—121 |
| 1,971,396 | 8/1934 | De Waide. | |
| 2,061,811 | 11/1936 | Sinko. | |
| 2,100,567 | 11/1937 | Nelson | 16—121 |
| 2,584,841 | 2/1952 | Caprez et al. | |
| 2,632,479 | 3/1953 | Pfeil et al. | |
| 2,835,060 | 5/1958 | Staaf | 40—140 |

EUGENE R. CAPOZIO, *Primary Examiner.*

R. CARTER, *Assistant Examiner.*